(12) United States Patent
Verman et al.

(10) Patent No.: US 8,249,220 B2
(45) Date of Patent: Aug. 21, 2012

(54) MULTICONFIGURATION X-RAY OPTICAL SYSTEM

(75) Inventors: Boris Verman, Bloomfield, MI (US); Yuriy Platonov, Troy, MI (US); Licai Jiang, Rochester Hills, MI (US)

(73) Assignee: Rigaku Innovative Technologies, Inc., Auburn Hills, MI (US)

( * ) Notice: Subject to any disclaimer, the term of this patent is extended or adjusted under 35 U.S.C. 154(b) by 0 days.

(21) Appl. No.: 12/578,667

(22) Filed: Oct. 14, 2009

(65) Prior Publication Data
US 2011/0085644 A1    Apr. 14, 2011

(51) Int. Cl.
*G21K 1/02*    (2006.01)
(52) U.S. Cl. .......................................... 378/147; 378/84
(58) Field of Classification Search .............. 378/84–85, 378/145–153
See application file for complete search history.

(56) References Cited

U.S. PATENT DOCUMENTS

| | | | |
|---|---|---|---|
| 4,174,478 A * | 11/1979 | Franks | 378/36 |
| 4,242,588 A | 12/1980 | Silk et al. | |
| 4,525,853 A | 6/1985 | Keem et al. | |
| 4,951,304 A | 8/1990 | Piestrup et al. | |
| 4,958,363 A | 9/1990 | Nelson et al. | |
| 5,027,377 A | 6/1991 | Thoe | |
| 5,132,997 A | 7/1992 | Kojima | |
| 5,138,158 A | 8/1992 | Ninomiya et al. | |
| 5,259,013 A | 11/1993 | Kuriyama et al. | |
| 5,604,782 A | 2/1997 | Cash, Jr. | |
| 6,014,423 A | 1/2000 | Gutman et al. | |
| 6,041,099 A | 3/2000 | Gutman et al. | |
| 6,327,335 B1 * | 12/2001 | Carroll | 378/85 |
| 6,359,964 B1 | 3/2002 | Kogan | |
| 7,248,670 B2 | 7/2007 | Hoghoj et al. | |
| 7,406,151 B1 * | 7/2008 | Yun et al. | 378/43 |
| 7,412,030 B1 | 8/2008 | O'Hara | |
| 2008/0084967 A1 * | 4/2008 | Matsuo et al. | 378/149 |

FOREIGN PATENT DOCUMENTS

| | | |
|---|---|---|
| EP | 0 459 833 A2 | 12/1991 |
| WO | WO 96/04665 | 2/1996 |

OTHER PUBLICATIONS

Notification of Transmittal of the International Search Report and the Written Opinion of the International Searching Authority, or the Declaration Dated Jan. 19, 2011.

* cited by examiner

*Primary Examiner* — Hoon Song
(74) *Attorney, Agent, or Firm* — Brinks Hofer Gilson & Lione

(57) ABSTRACT

An x-ray optical system includes an x-ray source which emits x-rays, a first optical element which conditions the x-rays to form two beams and at least a second optical element which further conditions at least one of the two beams from the first optical element.

7 Claims, 4 Drawing Sheets

MULTICONFIGURATION X-RAY OPTICAL SYSTEM

BACKGROUND

The present invention relates generally to an x-ray beam system.

There are various applications which utilize conditioned beams, which include, but are not limited to, directed, monochromatized, collimated or focused x-rays. For example, medical radiotherapy systems utilize x-rays to destroy malignant tissue, x-ray diffraction or scattering analysis systems channel x-ray radiation at a sample, crystal or non-crystal, to generate a diffraction or scattering pattern corresponding to its structure, and x-ray fluorescence and spectroscopy systems employ an x-ray beam to generate secondary radiation and analyze the secondary radiation to obtain compositional information.

In the field of x-ray diffraction, an x-ray instrument, such as a diffractometer, employs an x-ray beam conditioned by an optical system to meet certain requirements, including spatial definition (such as parallelism), spectrum purity, and intensity, as well as other requirements. These parameters, however, are typically interdependent and, therefore, cannot be optimized independently. That is, usually, improving or optimizing one parameter often times results in an unavoidable cost to the other parameters.

Different optical systems have been developed for different purposes in the aforementioned x-ray systems, such as, for example, parabolic multilayer reflectors for producing monochromatic parallel beams, parabolic multilayer reflectors coupled with channel-cut monochromator for producing $K\alpha 1$ parallel beams, and elliptical multilayer reflectors for producing monochromatic focusing beams.

Different optical systems are needed for different applications, or the capability of a diffractometer is limited. Significant effort may be required to change and align an optical component whenever it is installed or changed. Further, having these various optical systems can be costly.

BRIEF SUMMARY

In satisfying the above need, the present invention provides an improved x-ray optical system which provides more than one type of beam. The system includes an x-ray source which emits x-rays, a first optical element which conditions the x-rays to form two beams, a second optical element and an optional third element which further conditions one of the two beams from the first optical element and delivers it to the desired location. The desired location can be the location where a sample is positioned or the location where a detector is positioned. The first optical element delivers two beams that are collimated in at least one plane. The two beams, however, do not have to be in parallel to each other.

Some of the embodiments of the invention may provide the following advantages. The optical system produces different formalities of beams with a minimum number of components and with minimal effort to align the components.

Further advantages and features of the invention will become apparent from the following detailed description and from the claims.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. Moreover, in the figures, like reference numerals designate corresponding parts throughout the views. In the drawings:

FIG. 1b is also a cross-sectional view of the x-ray system as a one-dimensional system in which all the reflections occur in the cross-sectional plane;

FIG. 2b is also a cross-sectional view of the x-ray system as a one-dimensional system in which all the reflections occur in the cross-sectional plane;

FIGS. 3b and 3c are also cross-sectional views of the x-ray system as a one-dimensional system in which all the reflections occur in the cross-sectional plane.

DETAILED DESCRIPTION

The x-ray beam system disclosed in invention mainly concerns x-ray scattering and x-ray diffraction.

Figure 1A:
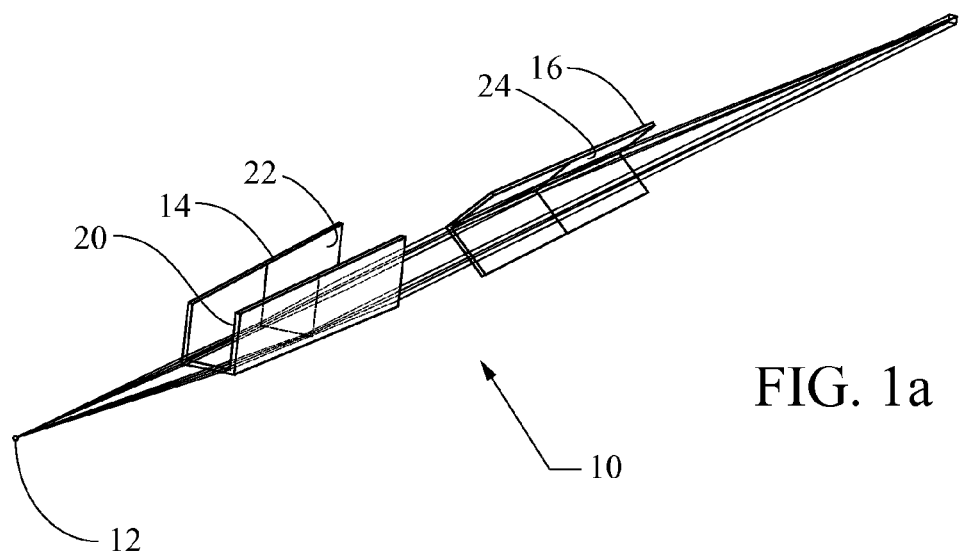
FIG. 1a is a diagrammatic view of an x-ray system in accordance with the invention.

Referring now to FIG. 1a, an x-ray system embodying the principles of the present invention is illustrated therein and designated at 10. As its primary components, the x-ray system 10 includes a source 12, such as, for example a laboratory x-ray source in point geometry or line geometry if the optical system is a one-dimensional system, a first optical element 14, and a second optical element 16. The first optical element 14 delivers two parallel beams and the second optical 16 element further conditions one of the two beams delivered by the first optical element. The first optical element 14 can be a Kirkpatrick-Baez optical system including two optics in which at least one of the two reflection surfaces of each optic is a multilayer reflector. Particularly, the optic in can be a "2-corner" side-by-side optical element, in which two reflectors are facing each other and the third reflector is perpendicular to the first two reflectors. The third reflector can be a multilayer reflector. Generally, multilayer reflectors may be employed as the reflecting surfaces for high flux and better spectrum definition.

Figure 1B:
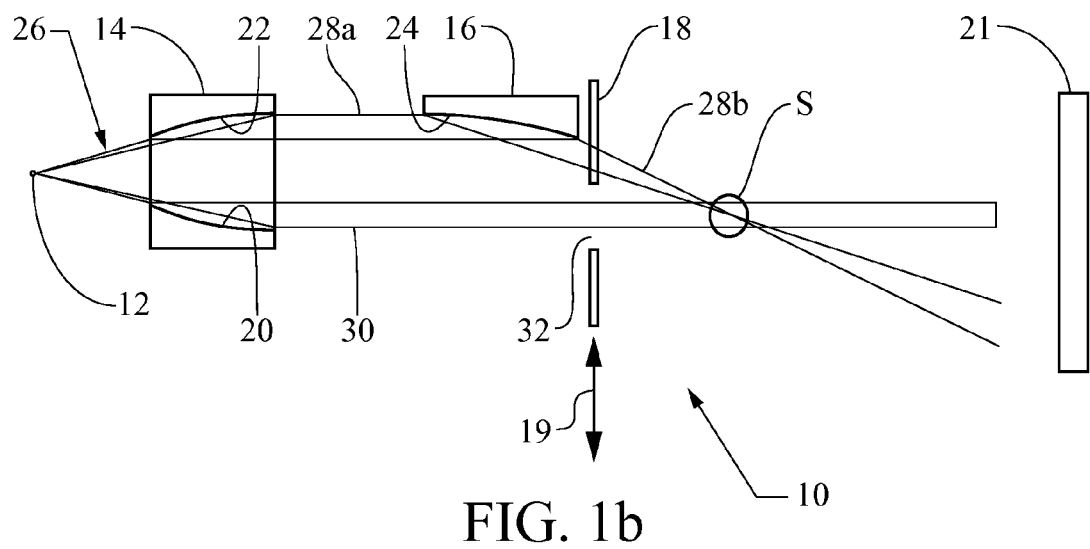
FIG. 1b is a cross-sectional schematic view of the x-ray system of FIG. 1a including a slit and a detector in accordance with the invention.

Shown in FIG. 1b is a cross-sectional view of the x-ray system 10 in a particular arrangement as a two-dimensional system. Further note that in other arrangements FIG. 1b also illustrates the cross-sectional view of the system as a one dimensional system in which all the reflections occur in the cross-sectional plane. The x-ray system 10 may include a slit 18 that is moveable as indicated by the arrow 19 and a detector 21. The first optical element 14 includes two working zones or optics 20 and 22, and the second optical element 16 is typically a focusing element with a reflecting surface 24.

The source 12 emits x-rays 26 at the first optical element 14, which in turn conditions the x-rays to form two collimated beams 28a and 30. The beams 28a and 30 are generally parallel beams in the reflection plane, or diffraction plane when the optical elements are multilayer reflectors. Both the reflection plane or diffraction plane are represented by the cross-sectional plane as shown in the figures, that is, the plane of the paper. As shown in this implementation, the reflection plane, diffraction plane and cross-section plane are the same. The beams 28a and 30 may or may not be parallel to each other in the cross-sectional plane. One beam 30 is directed at a sample S while the second optical element 16 focuses the beam 28a into a focused beam 28b at the sample S position or location as shown in FIG. 1b. The second optical element 16 may focus the beam 28b at the detector 21 or at any other suitable position depending on the application of the system 10. At any moment, in particular applications, only one beam 28b or 30 passes through an opening 32 of the slit 18. That is, the slit 18 can be employed to select the beam 30 and block the focusing beam 28b, or in other situations, the slit 18 blocks the focusing beam 28b and allows the parallel beam 30 to pass through the opening 32. In certain applications, the slit is able to allow both the focusing beam 28b and the parallel beam 30 to pass through the opening 32.

As viewed in an axial plane which is perpendicular to the reflection plane or diffraction plane, and therefore perpendicular to the cross-sectional plane, the beams 28a and 30 delivered from the first optical element 14 may be divergent beams, parallel beams, or focused beams. If the working zones 20 and 22 in the first optical element 14 are one-dimensional optics such as, for example, parabolic cylinder mirrors, the beams 28a and 30 are divergent in the axial plane. In this case, the reflection surface which is perpendicular to the working zones 20 and 22 is not employed.

If the beams 28a and 30 are parallel beams in the axial plane, the optics 20 and 22 are two-dimensional collimating optics. Either optic 20 or 22 (or both optics 20 and 22) can be made of two reflectors in the Kirkpatrick-Baez arrangement in either a sequential order or in the "side-by-side" arrangement as described in U.S. Pat. No. 6,041,099 and U.S. Pat. No. 6,014,423, both of which are incorporated herein by reference in their entirety. In some implementations, the first optical element 14 can be made of a full revolution of a parabloidal optic coupled with a slit, which delivers two parallel beams as well.

If the beams 28a and 30 are focusing beams in the axial plane, which are focused at the sample S, the detector 21, or any other desired position, each optic 20 and 22 in the first optical element 14 can also be may be made of two reflectors in the Kirkpatrick-Baez arrangement in sequential order or in the side-by-side arrangement. In such an arrangement, both reflectors 20 and 22 are collimating reflectors, such as, for example, parabolic reflectors, and the other reflector generally perpendicular to 20 and 22 is a focusing reflector, such as, for example, an elliptical reflector.

Figure 2A:
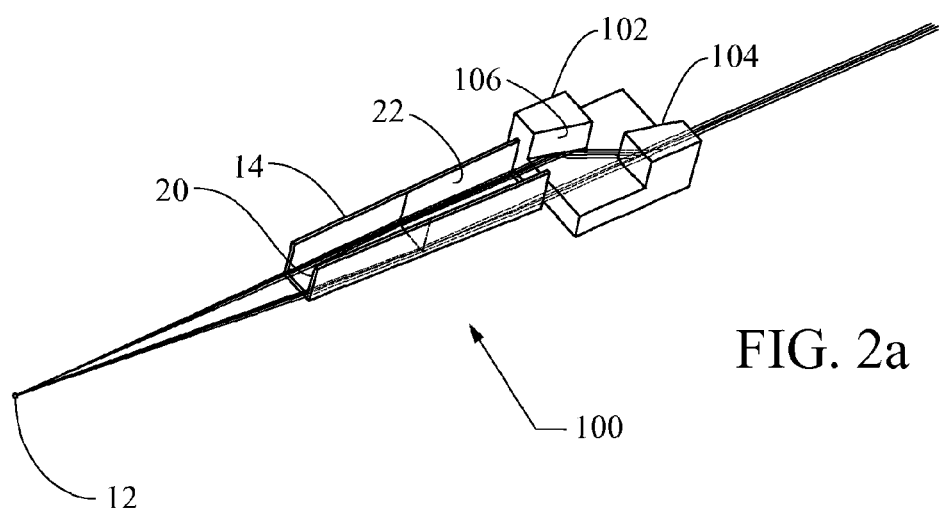
FIG. 2a is a diagrammatic view of another embodiment of an x-ray system in accordance with the invention.
Figure 2B:
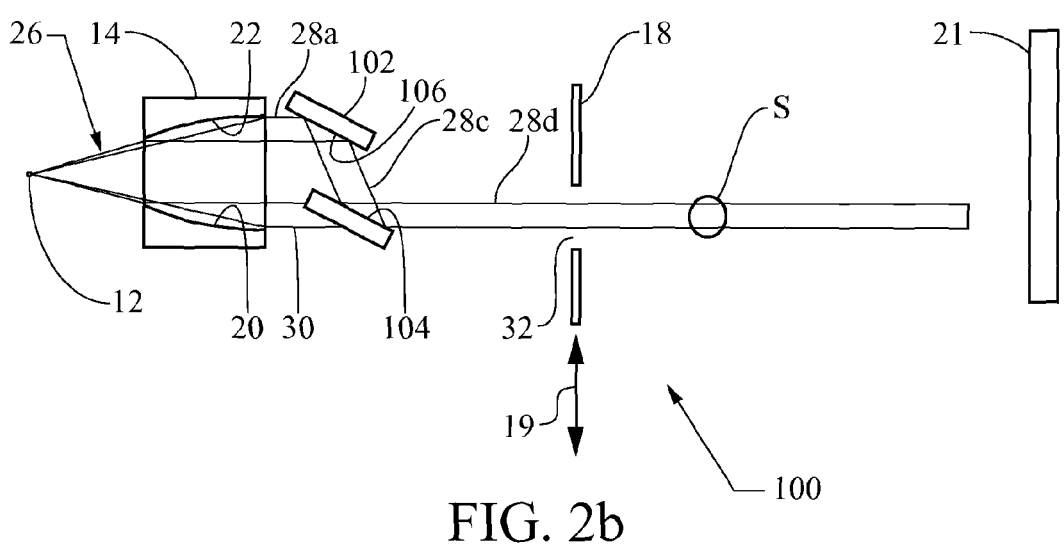
FIG. 2b is a cross-sectional schematic view of the x-ray system of FIG. 2a including a slit and a detector in accordance with the invention.

Referring now to FIG. 2a, an x-ray system 100 includes a channel-cut monochromator 102 as the second optical element to improve spectrum purity, angular resolution, or both. Shown in FIG. 2b is a cross-sectional view of the x-ray system 100 in a particular arrangement as a two-dimensional system. Further note that in other arrangements FIG. 2b also illustrates the cross-sectional view of the system as a one dimensional system in which all the reflections occur in the cross-sectional plane. As shown in FIG. 2b, the x-ray system 100 may also include the moveable slit 18 and the detector 21 described above in relation to the x-ray system 100.

The channel-cut monochromator 102 includes two reflection surfaces 104 and 106. The channel-cut monochromator 102 and the first optical element 14 are arranged in such a manner that the reflection surface 106 of the channel-cut monochromator 102 reflects the beam 28a as a beam 28c towards the beam 30. The reflection surface 104 of the channel-cut monochromator 102 further reflects the beam 28c as a beam 28d that is coincident with the beam 30 so that the beam 28a is further conditioned by the channel-cut monochromator 102. The beam 30 has the characteristic of high flux. The beam 28d has the characteristics with both high energy resolution and high spatial resolution. In this arrangement, switching between beam 30 and beam 28d involves the positioning and alignment of the channel-cut monochromator 102.

The x-ray system 100 optical system with the channel-cut monochromator 102 delivers a highly parallel beam with a well defined spectrum. The beam with high flux can be selected by moving the channel-cut monochromator 102 out of the path of beam 30. The beam with better definition can be selected by positioning the channel-cut monochromator 102 in its appropriate working position.

When two reflecting surfaces 104 and 106 of the channel-cut monochromator 102 are parallel to each other, the atomic planes reflecting x-rays are the same. In this case, the two collimated beams delivered by the first optical element 14 are in parallel to each other. Such a channel-cut monochromator is commonly referred to as a (+n, −n) monochromator. Sometimes, to provide sufficient spectrum purity, a channel-cut monochromator having two reflecting surfaces 104 and 106 with different atomic planes may be used. Such a channel-cut monochromator is often referred to as a (+m, −n) channel-cut monochromator. A (+m, −n) channel-cut monochromator has two reflecting surfaces at an angle (that is, not parallel to each other). To utilize a (+m, −n) channel-cut monochromator, the first optical element 14 delivers two collimated beams at an angle matching the (+m, −n) channel-cut so that the delivered beam 28d by the channel-cut is coincident with the beam 30.

The x-ray beam system disclosed in invention mainly concerns x-ray scattering and x-ray diffraction.
The channel-cut monochromator 102 can be a crystal made from, for example, a single crystal silicon or germanium.

When the system 100 is in use, a multilayer optic arrangement of the first optical element 14 can be employed to select a particular characteristic line Kα. The channel-cut monochromator can then be used to select the finer structure Kα2 or preferably Kα1 which is much more intense than Kα2.

Figure 3A:
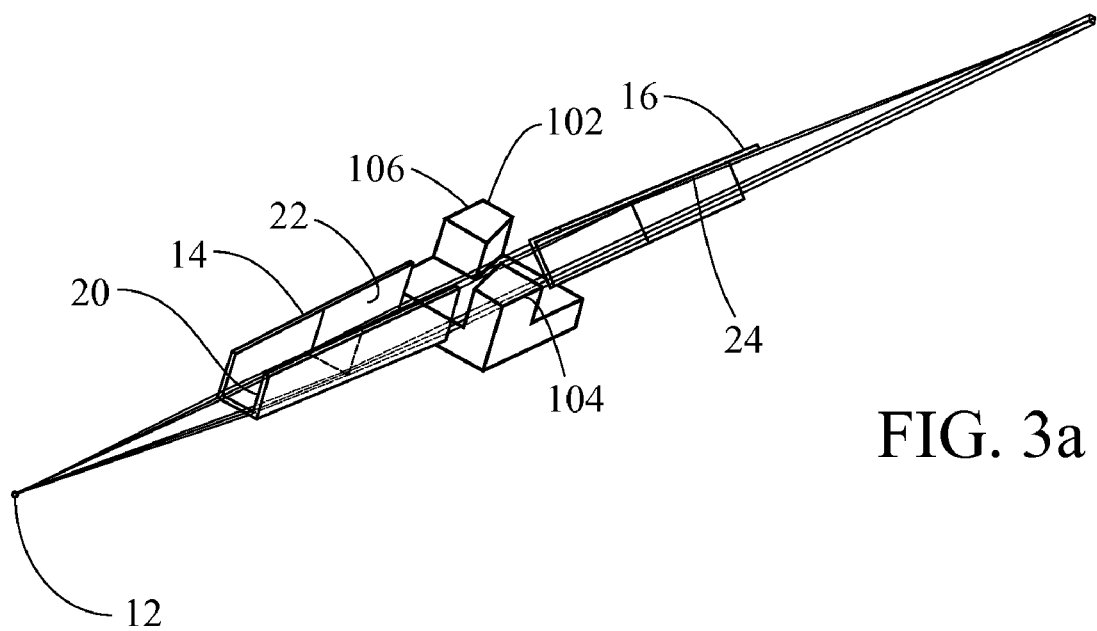
FIG. 3a is a diagrammatic view of yet another embodiment of an x-ray system in accordance with the invention.
Figure 3B:
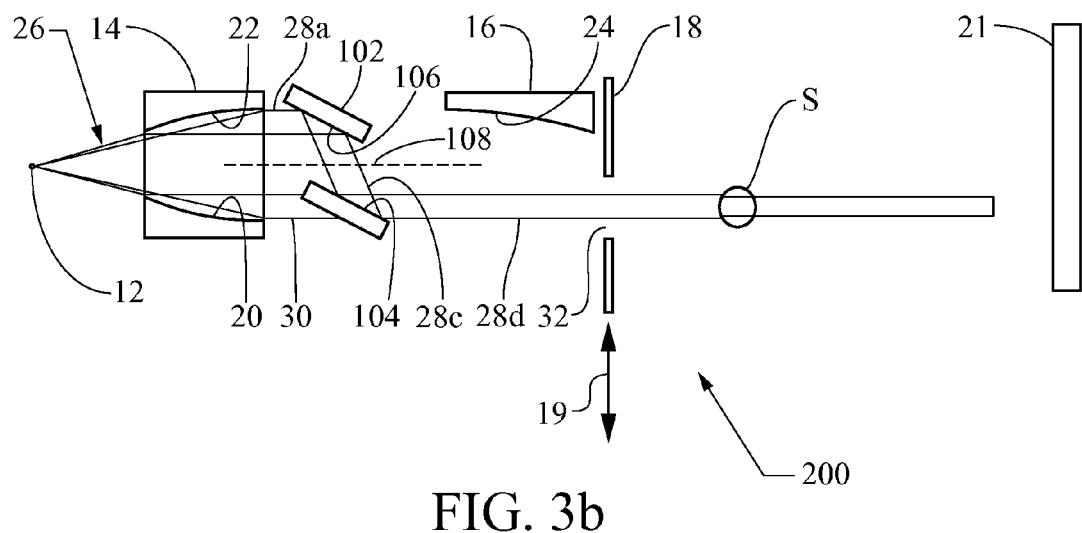
FIGS. 3b and 3c are cross-sectional schematic views of the x-ray system of FIG. 3a including a slit and a detector in accordance with the invention.
Figure 3C:
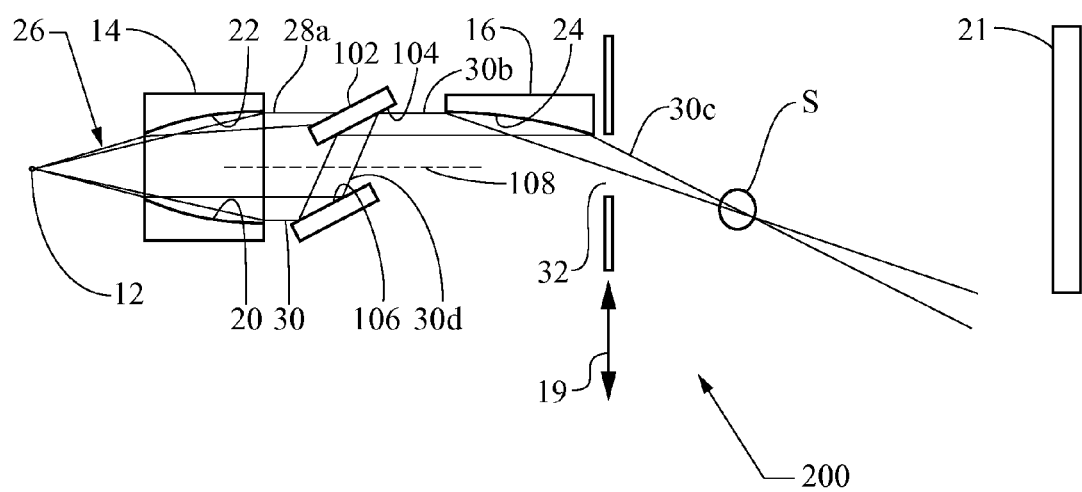

Shown in FIG. 3a, an x-ray optical system 200 combines the two-beam element 14, the channel-cut monochromator 102, and the parabolic reflector 16 in one system. Shown in FIGS. 3b and 3c are cross-sectional views of the x-ray system 200 in a particular arrangement as a two-dimensional system. Further note that in other arrangements FIGS. 3b and 3c also illustrate the cross-sectional views of the system as a one dimensional system in which all the reflections occur in the cross-sectional plane. FIGS. 3b and 3c further show the x-ray optical system 200 with the slit 18 and the detector 21 which were described above. Depending on the application of the x-ray system 200, the system 200 delivers a parallel beam with highly defined spectrum and angular resolution or a focused beam with a highly defined spectrum.

When providing parallel beam 28d that passes through the sample S, the channel-cut monochromator 102 is arranged as shown in FIG. 3b. In such an arrangement, the beam 30 is blocked by the channel-cut monochromator and the parallel beam 28d is produced as described above with reference to FIG. 2b.

When focusing a beam at the sample S or at the detector 21 or at any other suitable position, the channel-cut monochromator 102, initially in the position shown in FIG. 3b, is flipped 180° about an axis 108 as shown in FIG. 3c. As such, the channel-cut monochromator 102 blocks the beam 28a from the first optical element 14 while the reflection surface 106 reflects the beam 30 as a beam 30a towards the reflection surface 104 which in turn reflects the beam 30a as a beam 30b towards the parabolic reflector 16. The parabolic reflector 16 then reflects the beam 30b as a focused beam 30 towards the sample S or the detector 21 or any other desired position. Of course, changing back to the arrangement shown in FIG. 3b merely requires flipping the channel-cut monochromator in the position shown in FIG. 3c 180° about the axis 108 to the position shown in FIG. 3b.

The x-ray reflectors in optical elements 14 and 16 can be either total reflection optics or multilayer optics. The first 2-beam optical element 14 can be a 1-dimensional x-ray optic, that is, it reflects the x-rays in one plane only, commonly referred to as reflection plane or diffraction plane if it is a multilayer reflector. Such a plane is shown as the cross section plane in FIG. 1b, FIG. 2b and FIG. 3b. The first 2-beam optical element 14 can also be a 2-dimensional optic, that is, it reflects the x-rays in two planes, that is, both in the reflection/diffraction plane and the axial plane to form a 2-dimensional beam (a "pencil-like" beam).

If the first 2-beam optical element 14 is a 1-dimensional optic, then the parabolic reflector 24 of the optical element 16 provides a beam focused in one plane. And if the first 2-beam optical element 14 is a two-dimensional optic and with focusing characteristics in the axial plane, then the parabolic reflector 24 is a one-dimensional optic that focuses the beam 30c either at the sample S or the detector 21 or any other desired position.

For other arrangements, if the first optical 2-beam element 14 is a 2-dimensional optic and with collimating characteristics in the axial plane, then the optical element 14 with the parabolic reflector 24 can be either a one-dimensional optic that focuses the beam 30c in only one plane or a two-dimensional optic that focuses the beam 30c to a point at the sample S or the detector 21 or any other suitable position.

When any of the x-ray optical systems 10, 100, or 200 are employed as x-ray diffraction systems, a specific characteristic emission line is often chosen. Typical characteristic lines include Co Kα, Cr Kα, Cu Kα, Mo Kα, Ag Kα, as well as others. Multilayer optics are often employed to select one of these characteristic lines from a continuous spectrum, and these optics are further employed to collimate/focus x-rays to form a beam. These aforementioned characteristic lines, however, have fine structures that include multiple lines. For example, the characteristic line Cu Kα is a doublet that includes Kα1 and Kα2, and Kα1 is about twice intense as Kα2. In particular applications, for instance, in high resolution diffractometry, the combination of multilayer optics for the optical element 14 and the channel-cut monochromator 102 is employed to provide a highly defined spectrum by selecting only one of these multiple fine structured lines.

In summary, the aforementioned systems can provide a variety of beams of different spatial and spectral characteristics as shown in the following table:

TABLE 1

|  | Reference FIGS. | Cannel-cut monocromator (102) | Movable slit (18) |
| --- | --- | --- | --- |
| High intensity Kα collimated at least in one plane | 1b | Rotated 90 degrees from its nominal position in FIG. 2a | In the "down" position as it is shown in FIG. 1b |
| High brightness Kα beam focused in one or two planes | 1a, 1b | Rotated 90 degrees from its nominal position in FIG. 2a | In the "up" position " as it is shown in FIG. 3c |
| Low divergence Kα$_1$ beam | 2b | In nominal position | In the "down" position as it is shown in FIG. 1b |
| Focused Kα$_1$ beam in one or two planes | 3c | Rotated 90 degrees from its nominal position in FIG. 2a | In the "up" position as it is shown in FIG. 1b |

TABLE 1-continued

Among other features, the beams produced by the above-described systems pass the same desired location (sample). To achieve this, these systems are arranged such that all the optical elements match with each other, including the optic positions, the curvatures and d-spacing designs, the channel-cut selection and the design for the beam displacement.

Further, in some applications, any of four beams produced by the above-described systems can be delivered to the sample location by changing the positions of only two elements, such as the channel-cut monochromator and the slit. Changing the slit position does not affect the system alignment at all because its major function is blocking unwanted beams and its opening can be larger than the working cross-section of the beam.

The channel-cut monochromator is a sensitive element and may need to be realigned after changing its position. However, because two working positions of the channel-cut monochromator can be realized by a rotation about an axis in its diffraction plane, such rotation and positioning can be realized with good precision by the using precision mechanical components so that only fine alignment is needed.

Finally, the above systems enable one to choose an optimal solution for a specific application by simply repositioning and fine-aligning a small number of components manually or using computer controlled motorized means. It avoids having to have many optical systems that are sophisticated and require tedious change and system alignment and therefore saves cost and effort.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

What is claimed is:

1. An x-ray optical system comprising:
an x-ray source which emits x-rays;
a first optical element which conditions the x-rays to form two collimated beams; and
at least a second optical element which further conditions a first beam of the two beams from the first optical element, the first beam conditioned by the first and the second optical elements being directed at a desired location in a first operation mode and a second beam of the two beams conditioned by the first optical element being directed at the desired location in a second operation mode wherein the second optical element is a channel-cut crystal monochromator which conditions the first beam of the two beams from the first optical element, the first beam conditioned by the channel-cut monochromator having a beam path after the monochromator that is aligned with the beam path of the second beam from the first optical element.

2. The system of claim 1 wherein the channel-cut monochromator includes two reflecting surfaces with two different atomic planes.

3. The system of claim 1 wherein the channel-cut monochromator includes two reflecting surfaces with the same atomic planes.

4. The system of claim 1 further comprising a third optical element, the channel-cut monchromator being positioned between the first optical element and the third optical element, the third optical element further conditioning the first beam from the channel-cut monochromator.

5. The system of claim 4 wherein the third optical element is a parabolic reflector focusing the first beam conditioned by the channel-cut monochromator.

6. The system of claim 4 wherein the channel-cut monochromator is rotatable by about 180 degrees about an axis, so that either the first beam conditioned by the first optical element and the second optical element reaches the desired location or the second beam conditioned by the first optical element, the second optical element and the third optical element reaches the desired location.

7. The system of claim 1 wherein the channel-cut monochromator is rotatable by about 90 degrees about an axis, so that either the first beam conditioned by the first optical element and the second optical element reaches the desired location or the second beam conditioned by the first optical element reaches the desired location.

* * * * *